United States Patent [19]

Kosaka et al.

[11] Patent Number: 4,527,277
[45] Date of Patent: Jul. 2, 1985

[54] TIMING EXTRACTION CIRCUIT

[75] Inventors: Takashi Kosaka; Takamasa Koga; Kuniyoshi Konishi, all of Tokyo, Japan

[73] Assignee: Tokyo Shibaura Denki Kabushiki Kaisha, Kawasaki, Japan

[21] Appl. No.: 486,834

[22] Filed: Apr. 20, 1983

[30] Foreign Application Priority Data

Apr. 21, 1982 [JP] Japan ................................ 57-65450

[51] Int. Cl.³ ............................................. H04L 7/02
[52] U.S. Cl. ..................................... 375/82; 375/120; 307/516; 328/133
[58] Field of Search ........................ 375/80, 81, 82, 83, 375/119, 120; 328/133, 134; 307/516, 517, 527, 528; 329/50, 122, 124

[56] References Cited

U.S. PATENT DOCUMENTS

| | | | |
|---|---|---|---|
| 3,670,249 | 6/1972 | Meslener | 375/82 |
| 4,166,979 | 9/1979 | Waggener | 375/120 |
| 4,191,976 | 3/1980 | Braun | 375/120 |
| 4,218,771 | 8/1980 | Hogge, Jr. | 375/120 |
| 4,305,151 | 12/1981 | Johnson et al. | 375/82 |
| 4,371,974 | 2/1983 | Dugan | 375/120 |
| 4,371,975 | 2/1983 | Dugan | 307/516 |
| 4,380,815 | 4/1983 | Clendening | 375/120 |
| 4,400,667 | 8/1983 | Belkin | 375/120 |

Primary Examiner—Robert L. Griffin
Assistant Examiner—Stephen Chin
Attorney, Agent, or Firm—Cushman, Darby & Cushman

[57] ABSTRACT

A timing extraction circuit includes a phase comparator, a charge pump circuit, a filter circuit and a voltage controlled oscillator, these components constituting a phase-locked loop. The phase comparator compares the phases of a digital data signal and a timing signal and supplies first and second difference signals to the charge pump circuit. The charge pump circuit detects a phase error corresponding to the difference between the integrals of the first and second difference signals. The filter circuit supplies a control signal corresponding to the phase error to the voltage controlled oscillator. The voltage controlled oscillator generates the timing signal having a period corresponding to the control signal.

12 Claims, 40 Drawing Figures

FIG. 2

FIG. 3A  DIGITAL DATA SIGNAL

FIG. 3B  TIMING SIGNAL

FIG. 3C  F/F 214 Q-OUT SIG.

FIG. 3D  F/F 216 Q-OUT SIG.

FIG. 3E  FIRST DIFF. SIG.

FIG. 3F  SECOND DIFF. SIG.

FIG. 4A  DIGITAL DATA SIGNAL

FIG. 4B  TIMING SIGNAL

FIG. 4C  F/F 214 Q-OUT SIG.

FIG. 4D  F/F 216 Q-OUT SIG.

FIG. 4E  FIRST DIFF. SIG.

FIG. 4F  SECOND DIFF. SIG.

F I G. 6A  DIGITAL DATA SIGNAL

F I G. 6B  TIMING SIGNAL

F I G. 6C  F/F 304 Q-OUT SIG.

F I G. 6D  F/F 306 $\bar{Q}$-OUT SIG.

F I G. 6E  FIRST DIFF. SIG.

F I G. 6F  SECOND DIFF. SIG.

F I G. 7A  DIGITAL DATA SIGNAL

F I G. 7B  TIMING SIGNAL

F I G. 7C  F/F 304 Q-OUT SIG.

F I G. 7D  F/F 306 $\bar{Q}$-OUT SIG.

F I G. 7E  FIRST DIFF. SIG.

F I G. 7F  SECOND DIFF. SIG

FIG. 9A  DIGITAL DATA SIGNAL

FIG. 9B  TIMING SIGNAL

FIG. 9C  F/F 304 Q-OUT SIG.

FIG. 9D  F/F 306 Q-OUT SIG.

FIG. 9E  FIRST DIFF. SIG.

FIG. 9F  SECOND DIFF. SIG.

FIG. 10A  DIGITAL DATA SIGNAL

FIG. 10B  TIMING SIGNAL

FIG. 10C  F/F 304 Q-OUT SIG.

FIG. 10D  F/F 306 Q-OUT SIG.

FIG. 10E  FIRST DIFF. SIG.

FIG. 10F  SECOND DIFF. SIG.

– 4,527,277 –

TIMING EXTRACTION CIRCUIT

BACKGROUND OF THE INVENTION

This invention relates to a timing extraction circuit, which extracts clock components, i.e., a timing signal for data regeneration, from a digital data signal and can be used for, for instance, a receiving section of a repeater for digital transmission.

Figure 1:
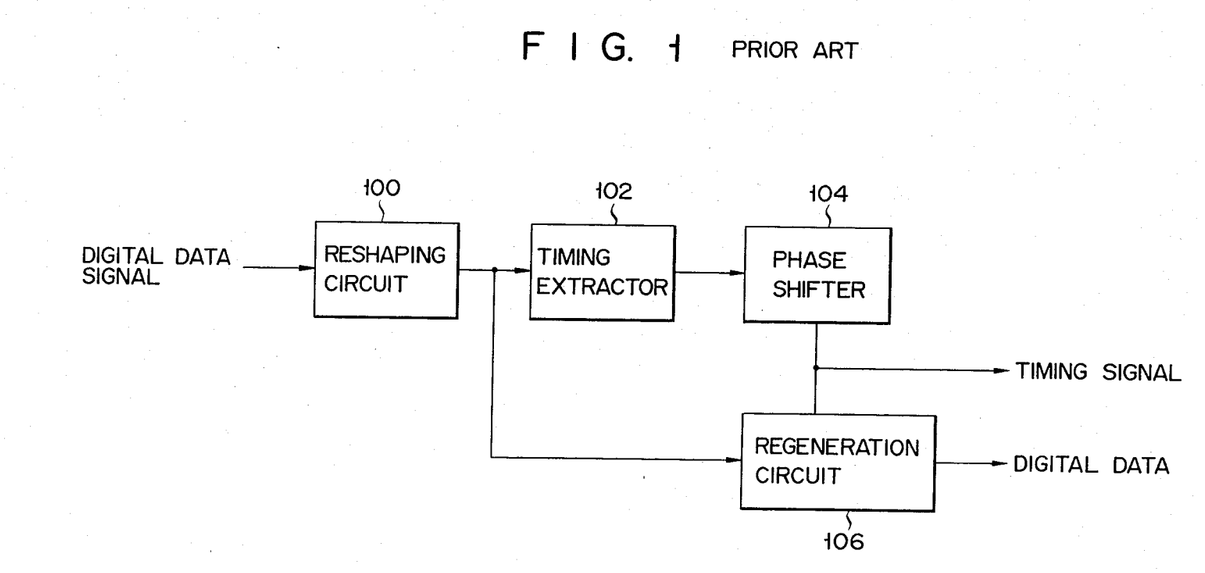
FIG. 1 is a block diagram showing a prior art receiving section of a repeater for digital transmission.

The digital data signal includes a series of bits and is represented as a pulse signal of line code, e.g., a return-to-zero (RZ) line code or non-return-to-zero (NRZ) line code. FIG. 1 shows a prior art receiving section of a repeater used for digital transmission. The digital data signal received by the receiver has been distorted during transmission. A reshaping circuit 100 reshapes the distorted pulses of the digital data signal into raised cosine pulses through equalizing amplification. (The reshaping circuit 100 may descramble the digital data signal, if the signal has been scrambled.) The digital data signal having passed through the reshaping circuit 100, is fed to a timing extractor 102 having a tank circuit. The timing extractor 102 supplies a sinewave signal with a frequency corresponding to the average frequency of the digital data signal to a phase shifter 104. The phase shifter 104 includes a delay circuit and a pulser. The phase shifter 104 phase-shifts the signal from the timing extractor 102, producing a pulse signal synchronized with the shifted signal. The pulse signal is fed as a timing signal to a regeneration circuit 106 and also to a transmitting section of the repeater. The regeneration circuit 106 samples data from the digital data signal supplied from the reshaping circuit 100 in response to the leading or trailing edge of the timing signal pulses. The sampled data is fed to the transmitting section.

With the above repeater, however, in order for the timing extractor 102 to be able to obtain a sine wave signal having a frequency corresponding to the average frequency of the digital data signal, it is necessary to adjust an inductor or capacitor in the tank circuit correspondingly. In addition, if the frequency of the digital data signal is greatly deviated from the resonant frequency of the tank circuit, it must be adjusted again. Further, the output signal of the timing extractor 102 is deviated in phase even if its frequency is made equal to the frequency of the digital data signal. The phase shifter 104 is therefore necessary for obtaining a timing signal for data sampling. Moreover, the conventional timing extractor with a tank circuit is susceptible to changes in ambient conditions such as ambient temperature, so that it requires a compensation circuit.

SUMMARY OF THE INVENTION

An object of the present invention is to provide a timing extraction circuit, which can produce an automatically phase-controlled timing signal according to a digital data signal.

The timing extraction circuit according to the invention comprises variable frequency oscillating means for producing a timing signal having a cycle corresponding to a control signal, phase comparing means for phase-comparing the timing signal and digital data signal to produce first and second difference signals having pulse widths respectively corresponding to the degrees of the phase lead and lag of the timing signal with respect to the digital data signal, and control means for providing an error signal derived from the difference between the pulse widths of the first and second difference signals as the control signal to the variable frequency oscillating means.

DETAILED DESCRIPTION OF THE PREFERRED EMBODIMENTS

Figure 2:
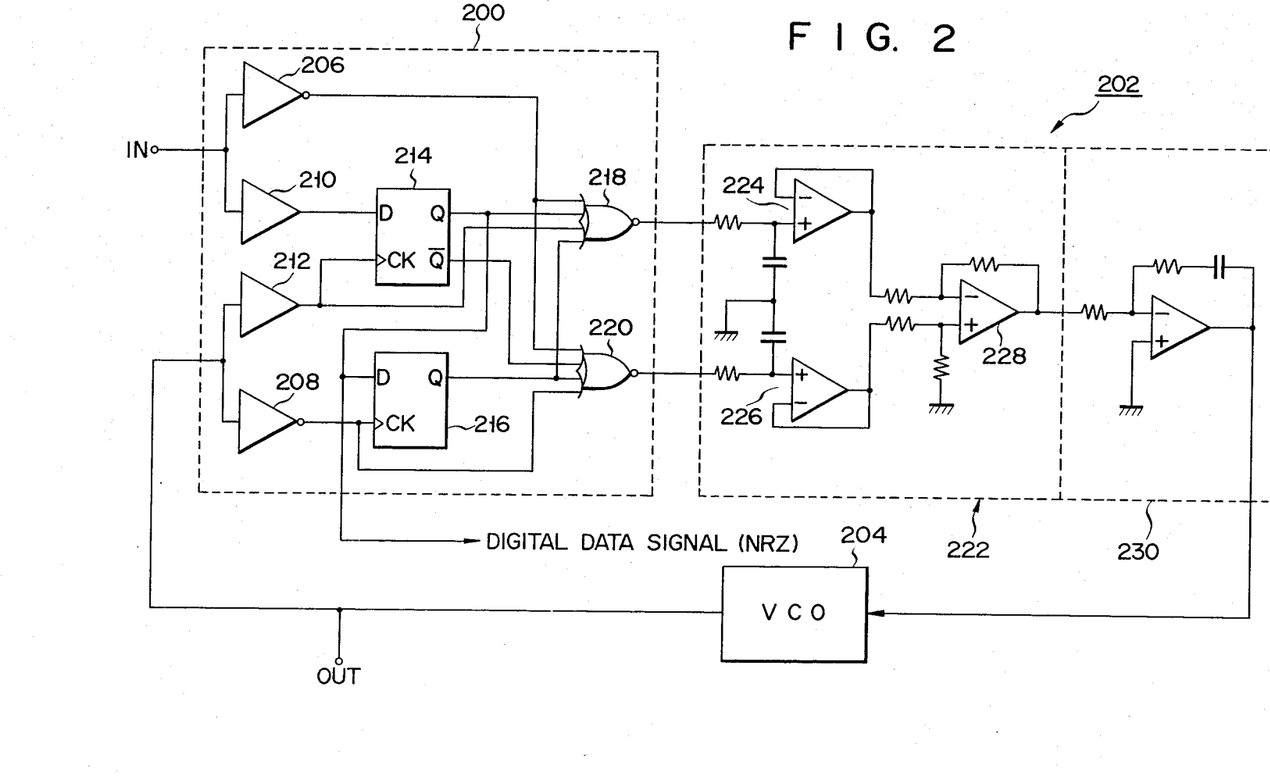
FIG. 2 is a circuit diagram of a timing extraction circuit in an embodiment of this invention.

FIG. 2 shows a timing extraction circuit embodying this invention. The circuit includes a phase comparator 200, a control circuit 202 and a variable frequency oscillator, e.g., a voltage controlled oscillator 204, these components constituting a phase-locked loop.

The phase comparator 200 receives a digital data signal in the form of an RZ line code via an input terminal IN from, for example, a reshaping circuit of a digital repeater (not shown). The phase comparator 200 also receives a timing signal from the voltage controlled oscillator (VCO) 204 as a feedback signal. The phase comparator 200 includes inverters 206 and 208 and buffers 210 and 212 as input gate circuits, D-type flip-flops 214 and 216, and 4-input NOR gates 218 and 220. The input terminal IN is connected to the inverter 206 and also to the buffer 210. The inverter 208 and buffer 212 have their input terminals connected to the VCO 204. The output terminal of the buffer 210 is connected to the D input terminal of the flip-flop 214. The output terminal of the buffer 212 is connected to the clock input terminal of the flip-flop 214. The Q output terminal of the flip-flop 214 is connected to the D input terminal of the flip-flop 216. The output terminal of the inverter 208 is connected to the clock input terminal of the flip-flop 216. The output terminal of the inverter 206, output terminal of the buffer 212, Q output terminal of the flip-flop 214 and Q output terminal of the flip-flop 216 are connected to respective input terminals of the NOR gate 218. The NOR gate 218 produces a first difference signal. The output of the inverter 206, output of the inverter 208, $\overline{Q}$ output terminal of the flip-flop 214 and Q output terminal of the flip-flop 216 are connected to respective input terminals of the NOR gate 220. The NOR gate 220 produces a second difference signal.

The control circuit 202 includes a charge pump circuit 222 having integrators 224 and 226 and a subtracter 228, and a filter circuit 230, e.g., an active filter. The output terminal of the NOR gate 218 in the phase comparator 200 is connected to the input terminal of the integrator 224. The output of the NOR gate 220 in the phase comparator 200 is connected to the input terminal of the integrator 226. The output terminals of the integrators 224 and 226 are connected to respective input terminals of the subtracter 228. The output terminal of the subtracter 228 is connected through the filter circuit 230 to a control input terminal of the voltage controlled oscillator 204 as the variable frequency oscillator. The output terminal of the VCO 204 is connected to the output terminal OUT. The VCO 204 produces pulses which are controlled in phase and frequency according to the error signal from the control circuit 202.

The operation of the timing extraction circuit having the above construction according to this invention will now be described. Referring to FIGS. 3A to 3F, the phase comparator 200 is supplied with the digital data signal shown in FIG. 3A (in the form of an RZ line code) and feedback timing signal shown in FIG. 3B. In the RZ line code, each pulse of digital data signal becomes low in a time slot or a bit period T. The comparator 200 divides the high level period of the digital data signal into a first and a second signal component in response to the leading edge of the timing signal, and supplies first and second difference signals shown in FIGS. 3E and 3F corresponding to the respective first and second signal components to the control circuit 202. The charge pump circuit 222 of the control circuit 202 integrates the first and second difference signals and obtains the difference between these integrals. The output signal of the charge pump circuit 222 is passed through the filter circuit 230 to be supplied as an error signal to the VCO 204. The timing signal from the VCO 204 is varied to reduce a phase error signal from the charge pump circuit 222 according to the error signal.

The operation of the phase comparator 200 will now be described in further detail. The D-type flip-flop 214 produces a Q output signal shown in FIG. 3C in accordance with the digital data signal in response to the rising of the timing signal shown in FIG. 3B. The Q output signal of the flip-flop 214, shown in FIG. 3C, is supplied to the D input terminal of the flip-flop 216. The timing signal is inverted by the inverter 208 to be supplied as a clock input signal to the flip-flop 216. The flip-flop 216 produces a Q output signal shown in FIG. 3D in accordance with the Q output signal from the flip-flop 214 in response to the rising of the inverted timing signal. The Q output signal of FIG. 3D is delayed by a period corresponding to the pulse duration of the timing signal with respect to the Q output signal of FIG. 3C. The digital data signal, inverted timing signal and Q output signals of the flip-flops 214 and 216 are supplied to the NOR gate 218. The NOR gate 218 produces the first difference signal, as shown in FIG. 3E. The digital data signal, inverted timing signal, $\overline{Q}$ output signal of the flip-flop 214, and the Q output signal of the flip-flop 216 are supplied to the NOR gate 220. The NOR gate 220 produces the second difference signal, as shown in FIG. 3F. The shaded portions of the first and second difference signals shown in FIGS. 3E and 3F respectively correspond to the first and second signal components which are obtained by dividing a pulse appearing in the logic value "1" bit period of the digital data signal at the leading edge of the timing signal of FIG. 3B. Each of the shaded portions of the first difference signal shown in FIG. 3F represents a lag element corresponding to the first signal component of a pulse in the digital data signal of FIG. 3A. Each of the shaded portions of the second difference signal shown in FIG. 3F represents a leading element corresponding to the second signal component of the pulse in the digital data signal. When the leading element and lag element are equal, the leading edge of the timing signal is at the center of the pulse in the digital data signal. In this case, the timing signal thus has an optimum phase for the regeneration. That is, using this timing signal with the optimum phase, the digital data signal can be properly regenerated in the regeneration circuit (not shown).

Figures 3A, 3B:
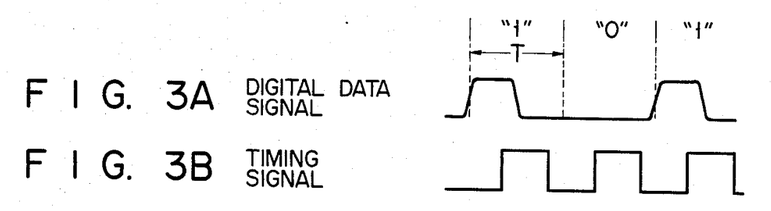
FIGS. 3A–3F and FIGS. 4A–4F are timing charts for illustrating the operation of a phase comparator in the timing extraction circuit of FIG. 2.
Figure 3C:
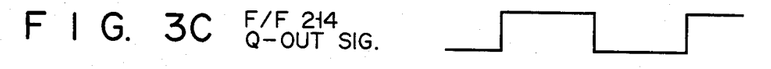
Figure 3D:
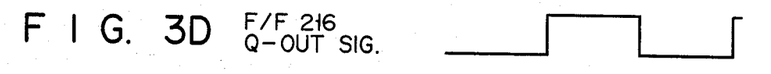
Figure 3E:
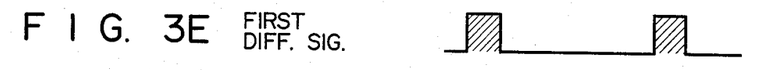
Figure 3F:
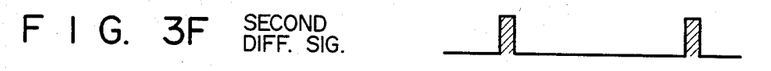

In an example of FIGS. 3A to 3F, the leading element is less than the lag element, and in this case, the phase of the timing signal of FIG. 3B lags behind the center of the pulse in the digital data signal by an amount corresponding to the difference between the leading and lag elements. The first and second difference signals (shaded portions) from the phase comparator 200 are integrated by the respective integrators 224 and 226 in the charge pump circuit 222. The subtracter 228 detects the phase error of the timing signal by deriving the difference between the output signals of the integrators 224 and 226. The active filter produces an error signal corresponding to the output signal of the subtracter to control the VCO 204. The VCO 204 provides a timing signal in the form of pulses, having a period corresponding to the error signal voltage, to the output terminal OUT. This timing signal is fed back to the phase comparator 200. In the example of FIGS. 3A to 3F, since the lag element of FIG. 3E is greater than the leading element of FIG. 3F, the phase of the timing signal from the voltage controlled oscillator 204 is advanced.

Figure 4A:
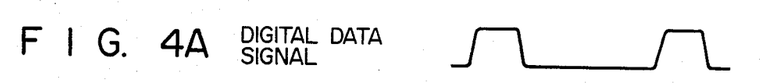
Figure 4B:
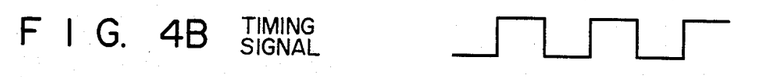
Figure 4C:
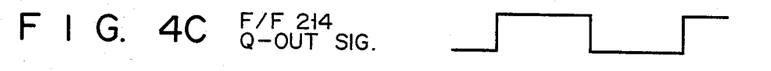
Figure 4D:
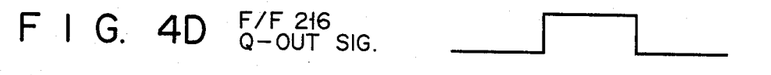
Figure 4E:
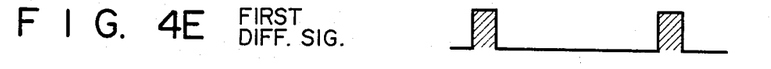
Figure 4F:
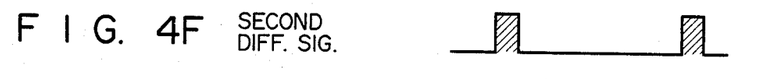

The timing signal supplied to the phase comparator 200 thus becomes as shown in FIG. 4B. The shaded portions of the first and second difference signals shown in FIGS. 4E and 4F have an equal area. The cycle of the timing signal provided from the VCO 204 is locked by the control circuit 202. That is, the phase lock is effected.

The flip-flop 214 in the phase comparator 200 has the role of locking the phase of the timing signal to be 90° out of (lagging behind) the phase of the pulse in the logic "1" bit period of the digital data signal, and a role of inhibiting the phase lock of the timing signal at 270° out of (lagging behind) the phase of the pulse in the logic "1" bit period of the digital data signal. The flip-flop 216 prevents the number of leading elements of the second difference signal from being erroneously increased when the logic values of "1" are generated continuously and serves to permit timing extraction on the basis of only the change of the logic value from "0" to "1".

It is to be appreciated that with the above embodiment of the timing extraction circuit the phase of the timing signal can be automatically locked to the center of the pulse in the digital data signal irrespective of the fact that the frequency of the digital data signal changes in accordance with an arbitrary digital data stream. Thus, the constant adjustment of the tank circuit, as required with the prior art timing extractor, can be dispensed with. Also, there is no need to provide a phase shifter including a delay circuit and other elements. Further, since the above embodiment of the timing extraction circuit is constructed to form a phase-locked loop, adverse effects of ambient conditions such as ambient temperature can be eliminated.

Further, the above embodiment is concerned with the digital data signal in the form of an RZ line code. However, it is also possible to supply a digital data signal in the form of a non-return-to-zero (NRZ) line code to the timing extraction circuit of FIG. 2. This is so because the circuit of FIG. 2 can effect timing extraction simply by detecting the rising of the digital data signal by virtue of the flip-flops 214 and 216.

With the digital data signal in the form of an NRZ line code, the high level period (which is twice the high level period of the RZ line code) can be divided into first and second signal components representing the respective lag and leading elements with respect to the leading edge of the timing signal as in the above embodiment. (This is possible, however, only for the high level period corresponding to the first data bit of "1" in the case of a series of data bits of logic value "1".) When the periods of the first and second signal components coincide with each other, the leading edge of the timing signal is at the center of the bit period of the digital data signal. At this time, the timing extraction circuit thus locks the phase of the timing signal. That is, the phase of the timing signal is locked to be 180° out of (i.e., lagging behind) the digital data signal.

Figure 5:
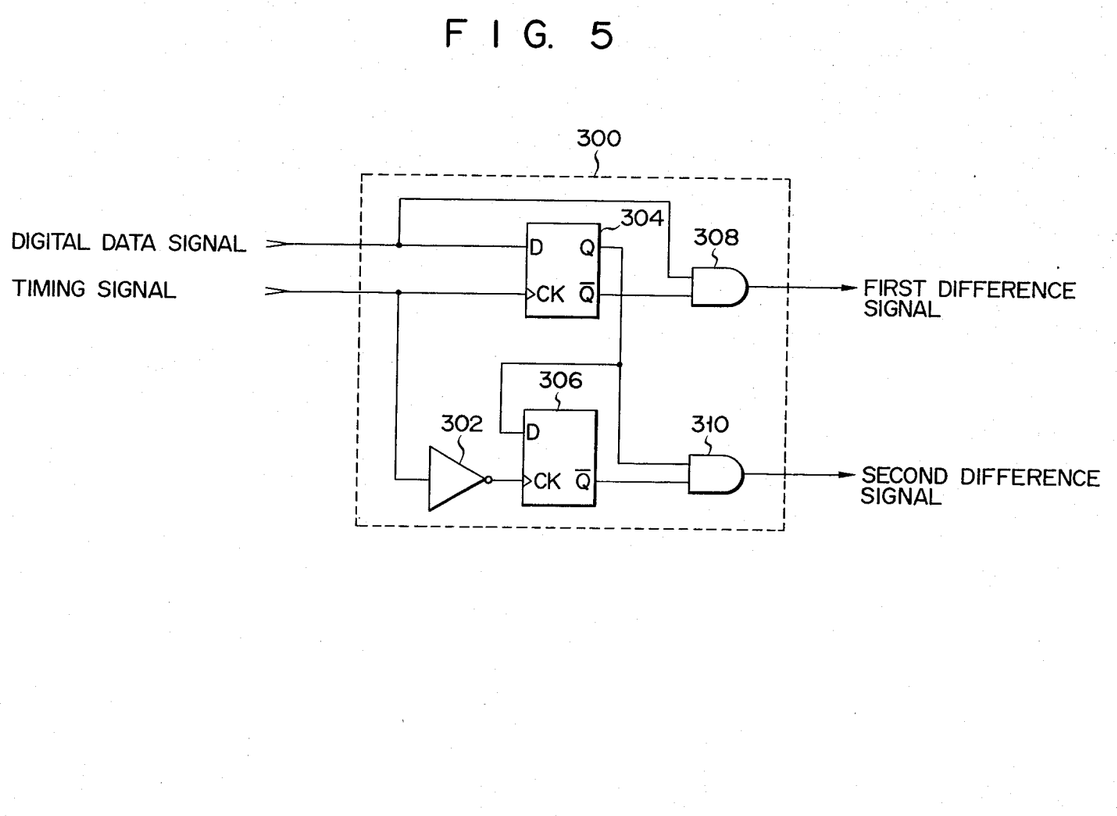
FIG. 5 is a circuit diagram of a phase comparator in a different embodiment of the timing extraction circuit according to this invention.
Figure 6A:
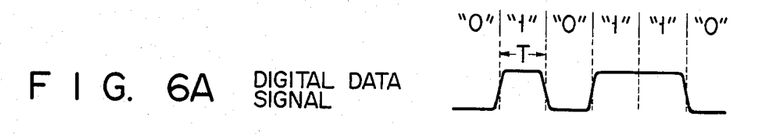
FIGS. 6A–6F and FIGS. 7A–7F are timing charts for illustrating the operation of the phase comparator shown in FIG. 5.
Figure 6B:
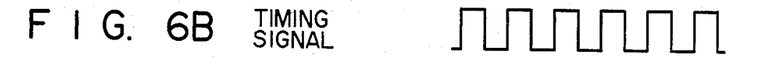
Figure 6C:
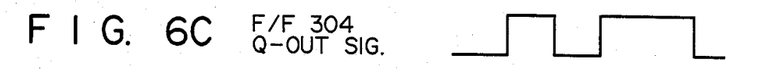
Figure 6D:
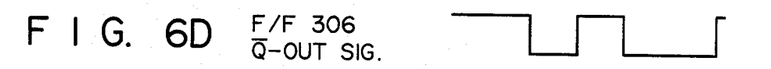
Figure 6E:
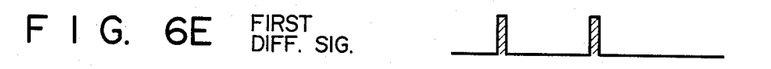
Figure 6F:
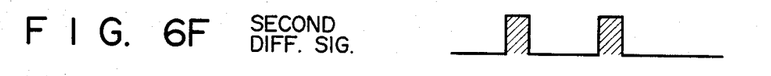
Figure 7A:
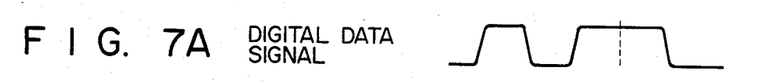
Figure 7B:
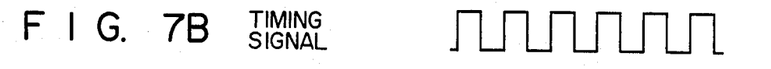
Figure 7C:
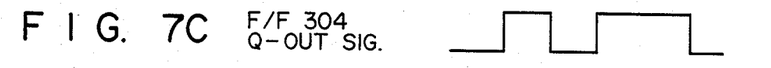
Figure 7D:
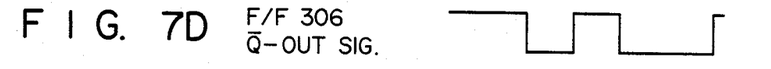
Figure 7E:
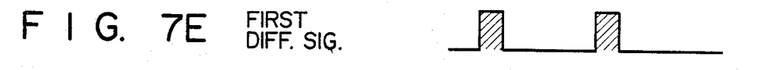
Figure 7F:
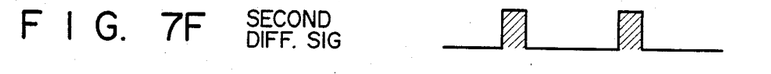

FIG. 5 shows a phase comparator 300 in a different embodiment of the timing extraction circuit according to this invention. This embodiment is the same as the embodiment of FIG. 2 except that the phase comparator 300 is used in lieu of the phase comparator 200.

The phase comparator 300 includes an inverter 302 as an input gate circuit, D-type flip-flops 304 and 306, and 2-input AND gates 308 and 310. A digital data signal is supplied to the D input terminal of the flip-flop 304. A timing signal is supplied to the clock input terminal of the flip-flop 304. The Q output terminal of the flip-flop 304 is connected to the D input terminal of the flip-flop 306. The inverted timing signal from inverter 302 is supplied to the clock input terminal of the flip-flop 306. The digital data signal and the $\overline{Q}$ output signal from the flip-flop 304 are fed to respective input terminals of the AND gate 308. The Q output signal of the flip-flop 304 and $\overline{Q}$ output signal of the flip-flop 306 are fed to respective input terminals of the AND gate 310. The AND gate 308 produces a first difference signal. The AND gate 310 produces a second difference signal.

FIGS. 6 and 7 are timing charts illustrating the operation of the phase comparator 300 when the phase of the timing signal is not locked and when it is locked respectively. The digital data signal shown in FIG. 6A is in the form of an NRZ line code, and the timing signal shown in FIG. 6B is fed back from the voltage controlled oscillator 204. The flip-flop 304 produces a Q output signal shown in FIG. 6C in accordance with the digital data signal in response to the leading edge of the timing signal. The Q output signal of the flip-flop 304 is fed to the D input terminal of the flip-flop 306. The flip-flop 306 produces a $\overline{Q}$ output signal shown in FIG. 6D in accordance with the Q output signal of the flip-flop 304 in response to the leading edge of the inverted timing signal. The AND gate 308 produces the first difference signal shown in FIG. 6E which is high level during a period from the rising of the digital data signal until the subsequent first rising of the timing signal. The AND gate 310 produces a second difference signal shown in FIG. 6F which is high level during a period from the rising of the timing signal until the subsequent first rising of the $\overline{Q}$ output signal of the flip-flop 306.

The first difference signal has the same features as in the previous embodiment. The second difference signal has a pulse duration equal to the pulse width of the timing signal which rises with the falling of the first difference signal. When a digital data signal in the form of an RZ line code is used as an input signal to the timing extraction circuit, it preferably has a duty ratio of 25%.

This timing extraction circuit, like the previous instance, locks the leading edge of the timing signal to the center of the bit period of the digital data signal. This is shown in FIGS. 7A to 7F. Therefore, the timing signal phase that is locked differs with the line code. More particularly, the timing signal is locked to a phase lagging 180° behind the digital data signal phase in the case of the NRZ line code while it is locked to a phase lagging 90° behind in the case of the RZ line code.

In high speed digital transmission, the pulse duration of the first and second difference signals comes to be narrow. Therefore, it is necessary to increase the loop gain of the control circuit 202, and the effects of jittering of the digital data signal are increased.

Figure 8:
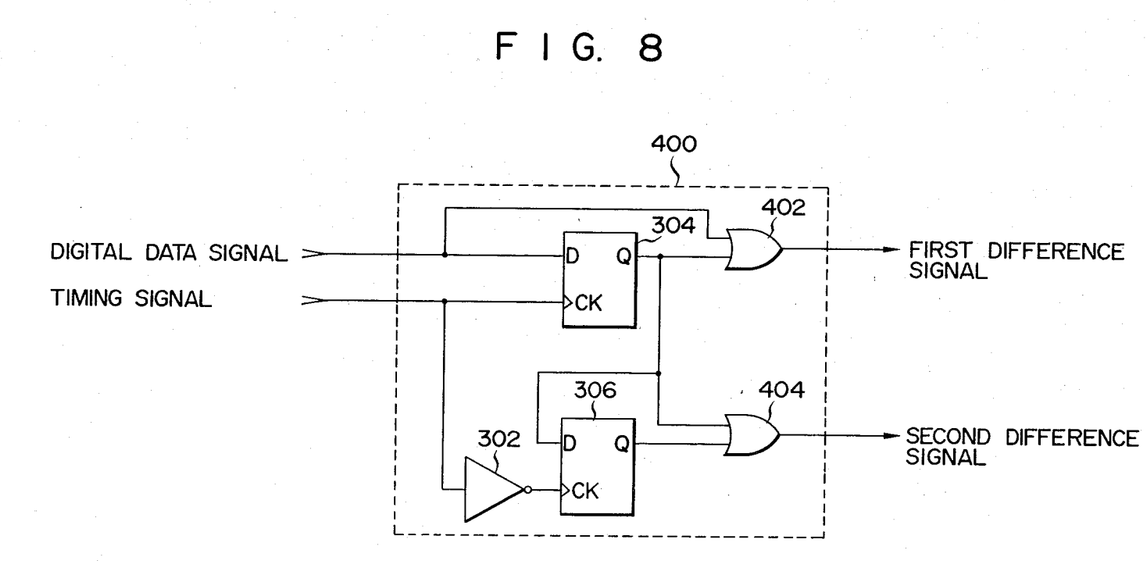
FIG. 8 is a circuit diagram of a phase comparator of a further embodiment of the timing extraction circuit according to this invention.

FIG. 8 shows a phase comparator 400 of a further embodiment of the timing extraction circuit for high speed digital transmission according to the invention. This embodiment is the same as the timing extraction circuit with the phase comparator 300 shown in FIG. 5 except that the logic gate circuit in the phase comparator 300 is modified. Therefore, like parts to those in FIG. 5 are designated by the same reference numerals.

The logic gate circuit of this phase comparator 400 includes OR gates 402 and 404. The OR gate 402 receives the digital data signal and the Q output signal from the flip-flop 304 and produces a first difference signal. The OR gate 404 recieves the Q output signals of the flip-flops 304 and 306 and produces a second difference signal.

FIGS. 9 and 10 are timing charts illustrating the operation of the phase comparator 400 when the timing extraction circuit is not phase locked and when it is phase locked respectively. The digital data signal shown in FIG. 9A is in the form of an NRZ line code, but it is also possible to deal with a digital data signal in the form of an RZ line code as in the previous embodiment.

Figure 9A:
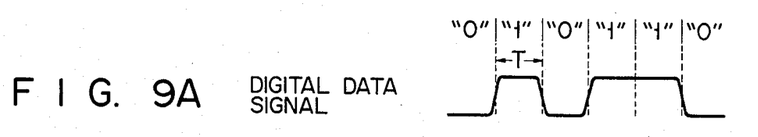
FIGS. 9A–9F and FIGS. 10A–10F are timing charts for illustrating the operation of the phase comparator shown in FIG. 8.
Figure 9B:
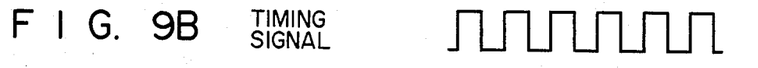
Figure 9C:
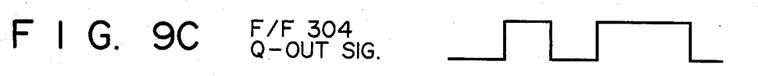
Figure 9D:
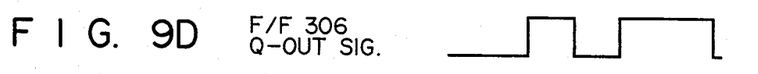
Figure 9E:
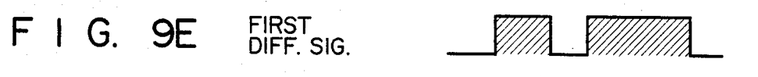
Figure 9F:
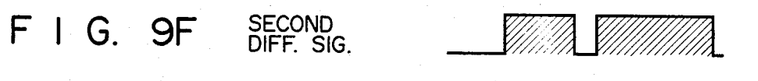
Figure 10A:
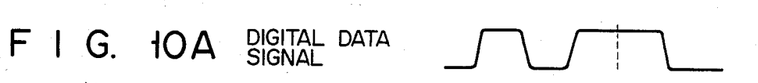
Figure 10B:
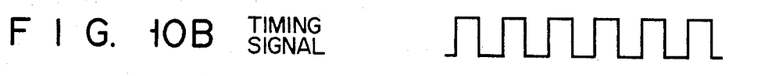
Figure 10C:
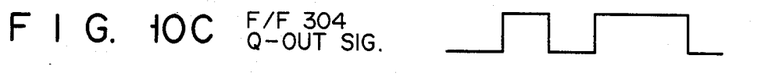
Figures 10D, 10E:
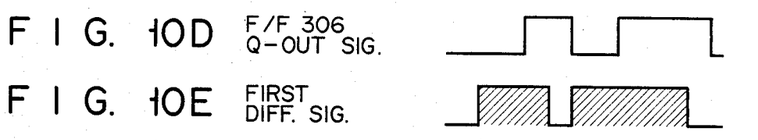
Figure 10F:
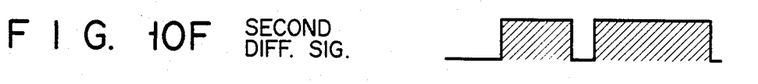

This timing extraction circuit, like the previous two embodiments, produces the first and second difference signals of FIGS. 9E and 9F and it is possible to detect phase error by comparing integrals of these signals. Thus, the timing signal for data sampling in the regeneration can be quickly locked to the center of the bit period corresponding to the line code of the digital data signal. The above operations are shown in FIGS. 10A to 10F.

The regeneration error depends upon the degree of distortion of the digital data signal and the degree of deviation of the timing signal from the center of a pulse in the bit period of the digital data signal (RZ) or the center of the bit period of the digital data signal (NRZ). Therefore, the regeneration error will not occur even when the timing signal is deviated from the optimum phase to some extent at the time of the phase correction.

What we claim is:
1. A timing extraction circuit comprising:
   a data input terminal for receiving a digital data signal of one selected RZ or NRZ line code;
   a clock output terminal to which a timing signal is supplied;
   phase comparing means for dividing a pulse of said digital data signal into leading and following portions in response to said timing signal fed back from said clock output terminal and for producing first and second difference signals having variable pulse durations respectively corresponding to the pulse widths of said leading and following portions; and control means for generating a phase error signal corresponding to the difference between the pulse durations of said first and second difference signals; and variable frequency oscillating means for supplying a timing signal to said clock output terminal, the period of said timing signal being controlled in accordance with said phase error signal to decrease the difference in pulse width between said leading and following portions.

2. A timing extraction circuit according to claim 1, wherein said phase comparing means includes:

first register means for holding a logic value of said digital data signal in response to the leading edge of said timing signal;

second register means for holding a logic value of the output signal from said first register means in response to the trailing edge of said timing signal; and first and second logic gate circuits for generating said first and said second difference signals in accordance with said digital data signal, the output signals of said first and second register means, and said timing signal.

3. A timing extraction circuit according to claim 2, wherein said first register means includes a first D-type flip-flop having a D-input terminal connected to said data input terminal and a clock input terminal connected to the output terminal of said variable frequency oscillating means;

said second register means include a first inverter and a second D-type flip-flop having a clock input terminal connected to said output terminal of said variable frequency oscillating means through said first inverter and a D-input terminal supplied with an output signal of said first D-type flip-flop:

said first logic gate circuit includes a second inverter and a first NOR gate having a first input terminal connected to said data input terminal through said second inverter, a second input terminal connected to the output terminal of said first D-type flip-flop, a third input terminal connected to the output terminal of said variable frequency oscillating means, and a fourth input terminal connected to the output terminal of said second D-type flip-flop; and said second logic data circuit includes a second NOR gate having a first input terminal connected to said data input terminal through said second inverter, a second input terminal connected to the inverted output terminal of said first D-type flip-flop, a third input terminal connected to the output terminal of said variable frequency oscillating means through said first inverter, and a fourth input terminal connected to the output terminal of said second D-type flip-flop circuit.

4. A timing extraction circuit according to claim 2, wherein said control means includes first and second integrators for integrating said respective first and second difference signals, and phase error detecting means for generating said phase error signal in accordance with the difference between the output signals of said first and second integrators.

5. A timing extraction circuit according to claim 4, wherein said phase error detecting means includes a subtractor for producing an output signal corresponding to a difference between the output signals of said first and second integrators, and a low-pass filter for integrating the output signal from said subtractor to produce the phase error signal.

6. A timing extraction circuit according to claim 1, wherein said variable frequency oscillating means is a voltage controlled oscillator.

7. A timing extraction circuit comprising:

a data input terminal for receiving a digital data signal of one selected RZ or NRZ line code;

a clock output terminal to which a timing signal is supplied;

phase comparing means for dividing a pulse of said digital data signal into leading and following portions in response to said timing signal fed back from said clock output terminal and for producing a first difference signal having a variable pulse duration corresponding to the sum of the period of said leading portion and a period proportional to that of the pulse of said digital data signal and, a second difference signal having a variable pulse duration corresponding to the sum of a pulse duration of said timing signal and said period proportional to that of the pulse of said digital data signal;

control means for generating a phase error signal corresponding to the difference between the pulse durations of said first and second difference signals; and variable frequency oscillating means for supplying a timing signal to said clock output terminal, the period of said timing signal being controlled in accordance with said phase error signal to decrease the difference in pulse width between said leading and following portions.

8. A timing extraction circuit according to claim 7, wherein said phase comparing means includes:

a first register means for holding a logic value of said digital signal in response to the leading edge of said timing signal;

a second register means for holding a logic value of the output signal in response to the trailing edge of said timing signal;

a first logic gate for generating said first difference signal in accordance with said digital data signal and the output signal of said first register means; and a second logic gate circuit for generating said second difference signal in accordance with the output signals of said first and second register means.

9. A timing extraction circuit according to claim 8, wherein said first register means includes:

a first D-type flip-flop having a D-input terminal connected to said data input terminal and a clock input terminal connected to the output terminal of said variable frequency oscillating means;

said second register means includes a first inverter and a second D-type flip-flop having a clock input terminal connected to the output terminal of said variable frequency oscillating means through said first inverter and a D-input terminal supplied with an output signal of said first D-type flip flop;

said first logic gate circuit includes a first OR gate having a first input terminal connected to said data input terminal and second input terminal connected to the output terminal of said first D-type flip-flop; and said second logic gate circuit includes a second OR gate having a first and second input terminal respectively supplied with output signals of said first and second D-type flip-flops.

10. A timing extraction circuit according to claim 8, wherein said control means includes first and second integrators for integrating said respective first and second difference signals, and phase error detecting means for generating a phase error signal in accordance with the difference between the output signals of said first and second integrators.

11. A timing extraction circuit according to claim 10, wherein said phase error detecting means includes a subtracter for producing the difference between the output signals from said first and second integrators and a low-pass filter for integrating the signal of said subtractor to produce the phase error signal.

12. A timing extraction circuit according to claim 7, wherein said variable frequency oscillating means is a voltage controlled oscillator.

* * * * *